United States Patent
Hildebrandt et al.

(10) Patent No.: US 8,035,548 B2
(45) Date of Patent: Oct. 11, 2011

(54) EVALUATION METHOD, PARTICULARLY FOR A DRIVER ASSISTANCE SYSTEM OF A MOTOR VEHICLE, FOR OBJECT DETECTION USING A RADAR SENSOR

(75) Inventors: Juergen Hildebrandt, Weilheim (DE); Joachim Hauk, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 12/291,952

(22) Filed: Nov. 14, 2008

(65) Prior Publication Data
US 2009/0140913 A1   Jun. 4, 2009

(30) Foreign Application Priority Data
Dec. 4, 2007   (DE) .......................... 10 2007 058 241

(51) Int. Cl.
*G01S 13/06* (2006.01)
(52) U.S. Cl. ............ 342/70; 342/80; 342/149; 342/152; 342/158
(58) Field of Classification Search .............. 342/70–72, 342/80, 147, 149, 152, 154–158
See application file for complete search history.

(56) References Cited

U.S. PATENT DOCUMENTS

| | | | | |
|---|---|---|---|---|
| 5,173,702 | A | * | 12/1992 | Young et al. ..................... 342/17 |
| 5,369,409 | A | * | 11/1994 | Urabe et al. .................... 342/133 |
| 5,402,129 | A | * | 3/1995 | Gellner et al. ................... 342/70 |
| 5,448,244 | A | * | 9/1995 | Komatsu et al. ............... 342/155 |
| RE36,095 | E | * | 2/1999 | Urabe et al. ................... 342/133 |
| 5,926,128 | A | | 7/1999 | Brash et al. |
| 6,005,511 | A | | 12/1999 | Young et al. |
| RE36,819 | E | * | 8/2000 | Gellner et al. ................... 342/70 |
| 6,292,129 | B1 | * | 9/2001 | Matsugatani et al. .......... 342/70 |
| 6,337,656 | B1 | * | 1/2002 | Natsume et al. .............. 342/149 |
| 6,549,158 | B1 | | 4/2003 | Hanson |
| 7,227,493 | B2 | * | 6/2007 | Oswald et al. .................. 342/70 |
| 7,586,436 | B2 | * | 9/2009 | Wakayama et al. ........... 342/147 |
| 2003/0151541 | A1 | * | 8/2003 | Oswald et al. .................. 342/70 |
| 2004/0119633 | A1 | * | 6/2004 | Oswald et al. .................. 342/70 |
| 2004/0155812 | A1 | * | 8/2004 | Pleva et al. ...................... 342/74 |

(Continued)

FOREIGN PATENT DOCUMENTS
DE   195 30 065   1/1997
(Continued)

OTHER PUBLICATIONS

Publication of Robert Bosch GmbH, "Adaptive Fahrgeschwindigkeitsregelung ACC, Gelbe Reihe, Ausgabe 2002, Technische Unterrichtung" ("Adaptive Speed Regulation ACC, Yellow Series, 2002 Edition, Technical Instruction").

(Continued)

*Primary Examiner* — John Sotomayor
(74) *Attorney, Agent, or Firm* — Kenyon & Kenyon LLP

(57) ABSTRACT

An evaluation method, e.g., for a driver assistance system of a motor vehicle, is provided for object detection using a radar sensor, which synchronously emits at least two separate radar beam lobes, that cover an angular range to be scanned, and which receives respective target responses as measured values. At least two target responses of the at least two separate radar beam lobes of the radar sensor are arithmetically superposed in such a way that a synthetic radar beam lobe is created having at least one predetermined zero value in the scanned angular range.

16 Claims, 2 Drawing Sheets

U.S. PATENT DOCUMENTS

2006/0250296 A1* 11/2006 Focke et al. .................. 342/70
2009/0140913 A1* 6/2009 Hildebrandt et al. .......... 342/70

FOREIGN PATENT DOCUMENTS

| DE | 199 34 670 | 12/2000 |
| DE | 10 2005 060 875 | 6/2007 |
| EP | 1 391 748 | 2/2004 |
| EP | 1 420 265 | 5/2004 |
| EP | 1 548 458 | 6/2005 |
| GB | 2 367 438 | 4/2002 |

OTHER PUBLICATIONS

Holpp, Wolfgang, "Radar- und Radiometer-Sensoren im Millimeterwellen-Bereich", NTZ Archiv, Bd. 11, Nr. 4, Jul. 1989, Seiten 165-174, XP000054462.

* cited by examiner

EVALUATION METHOD, PARTICULARLY FOR A DRIVER ASSISTANCE SYSTEM OF A MOTOR VEHICLE, FOR OBJECT DETECTION USING A RADAR SENSOR

BACKGROUND OF THE INVENTION

1. Field of the Invention

The present invention relates to a method and an evaluation system, e.g., for a driver assistance system of a motor vehicle, for object detection using a radar sensor.

2. Description of Related Art

An evaluation method for object detection, or rather an object detection system, may be applied, for example, within the scope of an adaptive cruise control and/or vehicle-to-vehicle ranging, or a driver assistance system of a motor vehicle. Such a control system is able to regulate a previously set travel speed and/or a previously set distance from a preceding vehicle or from objects located in the travel direction, or from target objects. This takes place while appropriately taking into account the surroundings of the motor vehicle and additional parameters, if necessary, such as the current weather conditions and visual conditions. Such a regulating system is also designated as adaptive speed regulation or an ACC (adaptive cruise control) system. In the publication of Robert Bosch GmbH, "Adaptive Fahrgeschwindigkeitsregelung ACC, Gelbe Reihe, Ausgabe 2002, Technische Unterrichtung" ("Adaptive Speed Regulation ACC, Yellow Series, 2002 Edition, Technical Instruction") such adaptive speed regulating devices are described. Particularly in view of the increasing traffic density of current times, the ACC system has to be flexible enough to react suitably to all traffic situations. This, in turn, requires an appropriate object detection sensor system, in order to supply in each travel situation the measured data required for the regulation, with respect to detected target objects or obstacles.

A method for collision avoidance may also be implemented within the scope of a driver assistance system for a motor vehicle, in which, in the case of at least one obstacle approaching during travel, a driving maneuver is carried out or proposed autonomously or semiautonomously. The at least one obstacle is also recorded using an evaluation system for object detection or rather an object detection system.

Such object detection systems or distance sensors are frequently implemented using radar sensors. Published German patent document DE 195 30 065 proposes a monostatic FMCW radar sensor for a vehicle for detecting objects, in which at least one antenna feed, in conjunction with a dielectric lens, is developed both for transmitting and for receiving a corresponding echo signal. A plurality of send/receive antennas are focused via a common lens. The FMCW radar sensor described has three side-by-side radiation lobes, which are partially able to intersect and which represent an active area in which an object is able to be detected. Consequently, when this is used in a motor vehicle, a plurality of objects may also be detected simultaneously. It may be distinguished, in this context, whether the objects are traveling in the travel direction of the motor vehicle, are standing at the side of the roadway or are approaching from the opposite direction.

It is desirable to make these radar sensors as small as possible in their dimensions, particularly in view of the space they require and the place of installation for them, that is to be selected. The relatively low aperture conditioned by this, particularly of the beam-forming optical elements or of the radar sensors, results in a low angular separation resolution capability, based on the respective radar beam lobes or beams that are relatively broad with respect to the angular range. Beams are usual that have 6 dB widths and an angular range of clearly more than 5°. Using known evaluation methods for object detection, target objects, for instance, which are at a distance of 2° from each other are not able to be separated. However, this could perhaps be important in the case of a so-called lane situation, especially on a multilane expressway or the like, if one's own vehicle is located in the middle lane and if there are also vehicles in the right lane and the left lane ahead of one's own vehicle in the travel direction. Depending on the distance from the other vehicles, it may happen, now, that the individual radar beam lobes cover several vehicles and that it therefore can no longer be ascertained whether the detected target objects are located in the right or the left lane, or whether an additional target object is located in the middle lane, that is, the lane traveled by one's own vehicle, since the target objects melt down to one target, and are no longer able to be separated into individual measurements, with respect to the angle.

Additional information regarding object detection systems, especially for a motor vehicle, is disclosed in published German patent document DE 199 34 670.

BRIEF SUMMARY OF THE INVENTION

The evaluation method according to the present invention, particularly for a driver assistance system of a motor vehicle for object detection using a radar sensor, which synchronously in time emits at least two separate radar beam lobes that cover an angular range that is to be scanned, and which receives their respective target responses as measured values, at least two target responses (that is, in each case one target response per radar beam lobe) of the at least two separate radar beam lobes of the radar sensor being arithmetically superposed in such a way that a synthetic radar beam lobe is created, having at least one predetermined zero value in the scanned angular range, makes possible in a simple and advantageous way a clear improvement of the resolution or the angular separation in the object detection. This may be done without additional use of hardware, and only using special software routines or a modified evaluation method in the object detection, with the aid of the radar sensor. If, for instance, an appropriate target object is detected in one's own lane, in a certain position, that is below a certain angle, a synthetic beam may be formed by an appropriate superposition of the target responses from two beams or separate radar beam lobes of the radar sensor, which has a sharp zero value at the detected position. Subsequently, by displacing the zero value to the measured angle, it may be checked whether only one target object is present at this angular position or, for instance, several target objects at an offset angle. If there is really only one target object present, its level has to diminish very greatly. If now the target object comes about from a superposition of two target objects (for instance, at a 120 m distance, each offset 3 m laterally in the side lanes), the signal amplitude would only decrease by a smaller part and would not vanish. This gives additional information with respect to the angular resolution. With the aid of the phase response between the beams or radar beam lobes of the radar sensors, a filter response having sufficiently steep sides may be achieved. A type of angle notch, or rather an angle notch filter is created by the zero value.

The arithmetic superposition may be carried out using a complex weighting of at least one of the at least two target responses, in such a way that, for a target object which was detected at the at least one predetermined zero value, the at least two target responses add up to zero. While taking into account the relationships between the radar beam lobes or beams according to a reference measurement, one of the beams is now multiplied by the absolute quotient to form an additional beam at the location at which the zero value is to be created, and is modified by phase rotation, which equalizes the phase difference at the angular position, desired for the zero value, between the two beams (that is, equal with respect to level, but having a phase difference of 180°) and is subtracted from the additional beam.

As was stated above, it is advantageous if the at least one predetermined zero value is placed at the angular value of the detected target object. This gives one additional information on the target object.

Furthermore, the at least one predetermined zero value may be placed at the angular value of the middle of the lane lying ahead of the motor vehicle.

In one example embodiment of the present invention, it may further be provided that a scanning displacement of the at least one predetermined zero value is carried out arithmetically in the scanned angular range.

Consequently, by a drifting of the angle notch or by a displacement of the zero value, a type of scanning may be carried out in a single measurement, whereby, so-to-speak, a virtual swivel takes place.

A computer program having program code means and a computer program product having program code means, which are stored on a computer-readable data carrier, in order to execute the methods according to the present invention, are also provided.

A device, especially a driver assistance system of a motor vehicle, for carrying out the methods according to the present invention is also provided.

The evaluation method and the method for collision avoidance for a motor vehicle may be implemented as a computer program on a control device of a driver assistance system of a motor vehicle and a radar sensor, other design approaches, of course, also coming into consideration. For this purpose, the computer program is stored in a memory element of the control device. The method is implemented by execution on a microprocessor of the control device. The computer program may be stored on a computer-readable data carrier (diskette, CD, DVD, hard disk, USB memory stick, memory card or the like) or an internet server as a computer program product and may be transmitted from there to the memory element of the control device.

DETAILED DESCRIPTION OF THE INVENTION

Figure 1:
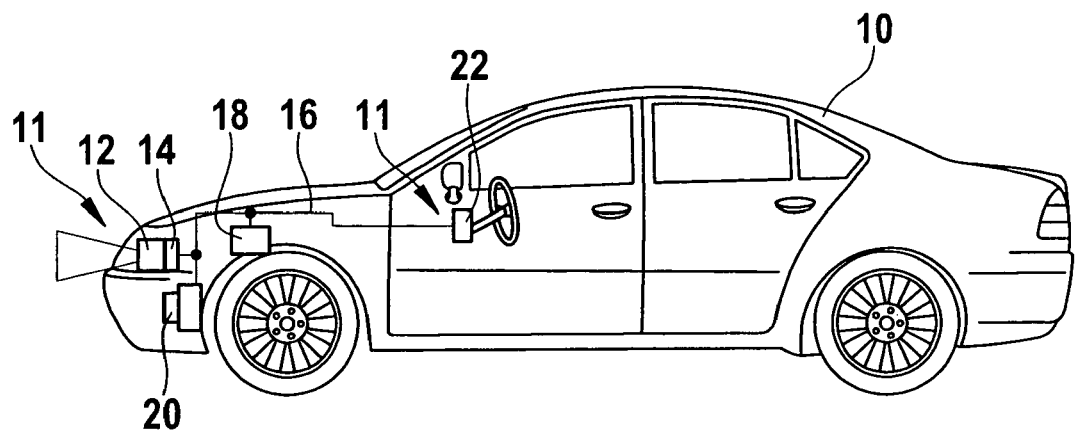
FIG. 1 shows a schematic representation of the essential components of an ACC system or an adaptive speed regulating device as driver assistance system, on whose control device an evaluation method according to the present invention and a method for collision avoidance is able to run.
Figure 2:
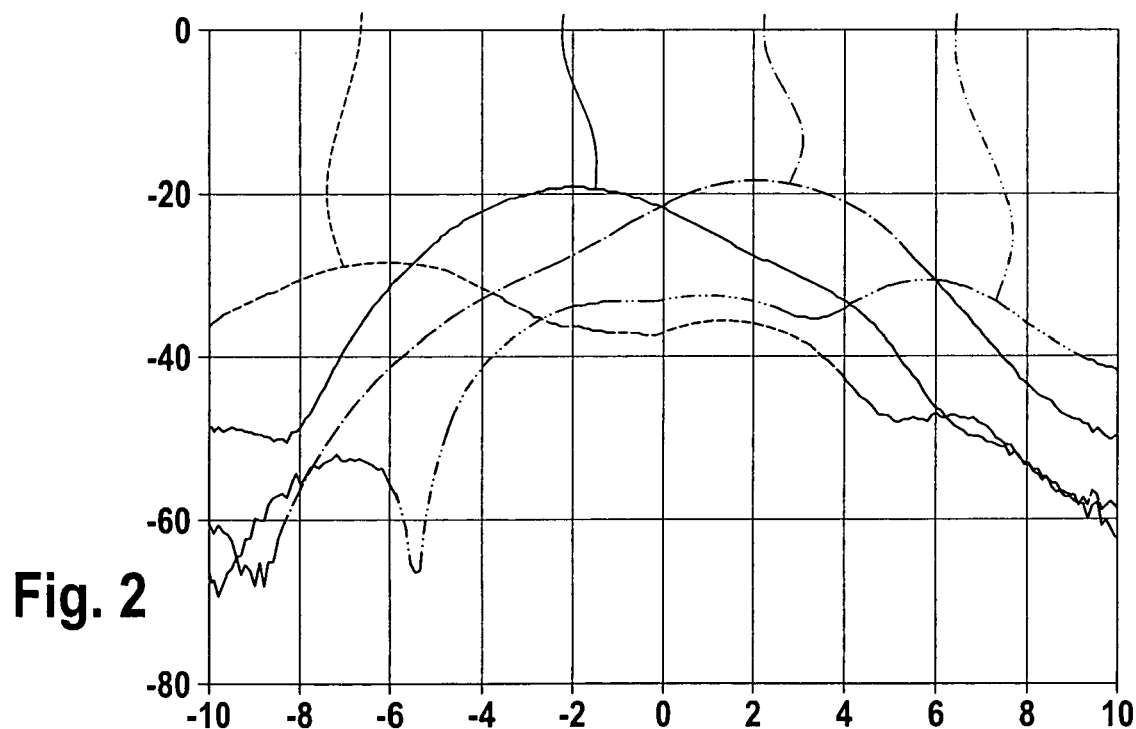
FIG. 2 shows a schematic antenna diagram of a radar sensor.
Figure 3:
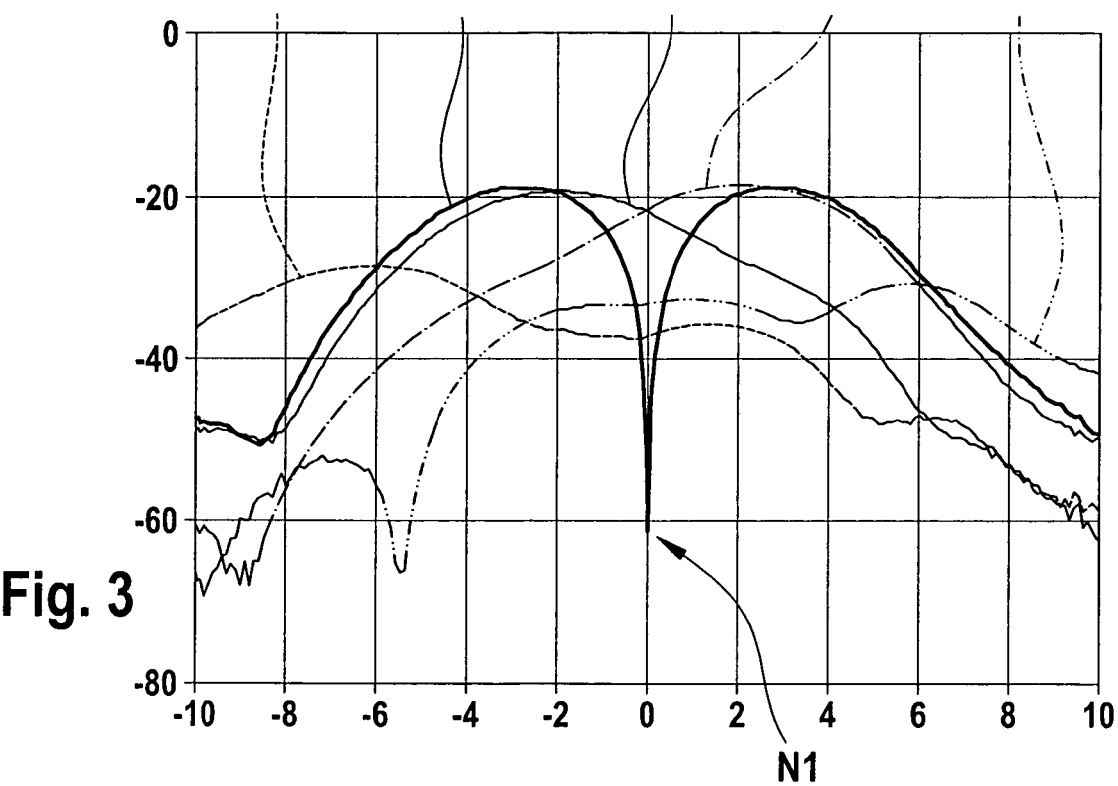
FIG. 3 shows a schematic antenna diagram of a radar sensor having a synthetic radar beam lobe.
Figure 4:
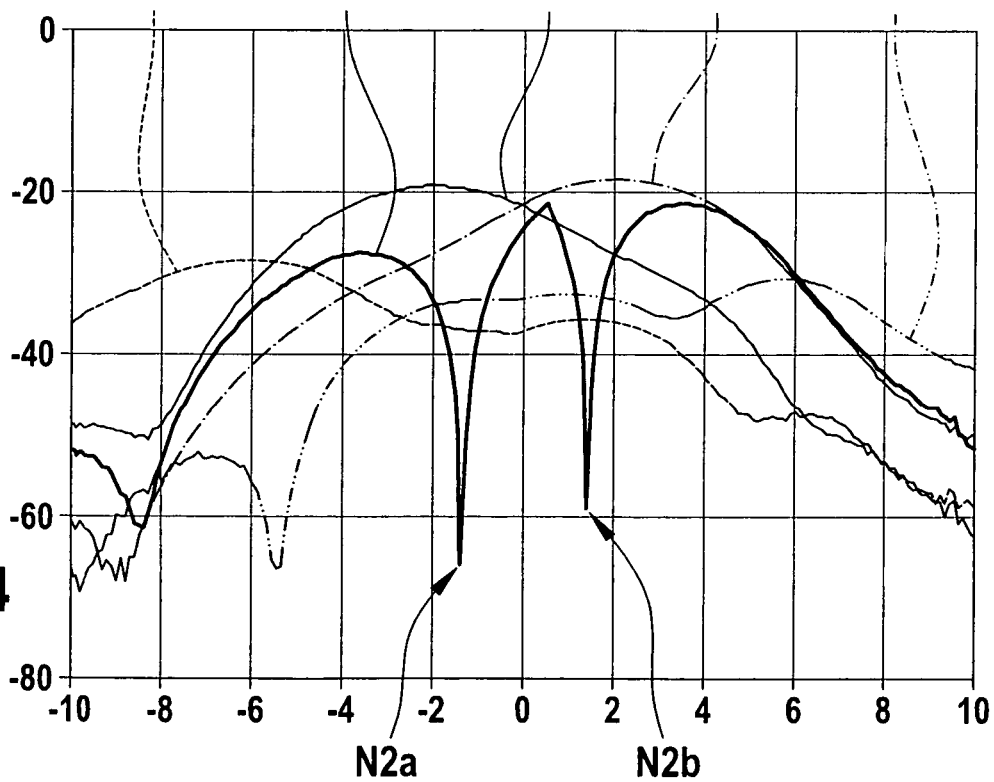
FIG. 4 shows a schematic antenna diagram of a radar sensor having an additional synthetic radar beam lobe.

A motor vehicle 10 shown in a greatly simplified manner in FIG. 1, having an ACC system or an adaptive speed regulating device 11 as driver assistance system, has as distance sensor a radar sensor 12 mounted on the front end of motor vehicle 10, in whose housing an ACC control device 14 is also accommodated. ACC control device 14 is connected via a data bus 16 (CAN, MOST or the like) to an electronic drive control unit 18, to a braking system control unit 20 and to an HMI control unit 22 of a man/machine interface. With the aid of radar beam lobes Beam1, Beam2, Beam3, Beam4 that are shown in FIG. 2, in simplified form, in an exemplary characteristic antenna diagram of radar sensor 12, radar sensor 12 measures the distances, relative speeds and the azimuth angle of target objects located ahead of the vehicle, that are not shown, which reflect radar waves. In FIG. 2, or rather basically also in FIGS. 3 and 4, antenna diagrams and azimuth angle diagrams are shown of horizontal sections of four radar beam lobes Beam1 to Beam4, which give the recording range of radar sensor 12. Horizontally, the azimuth angle is plotted in (°) and vertically, the level is plotted in decibels. Before using radar sensor 12, a so-called reference measurement is carried out in which special relationships with respect to power difference and phase difference between the individual radar beam lobes Beam1 to Beam4 are ascertained.

The radar raw data received during use at regular time intervals, e.g. every 10 ms, are evaluated in ACC control device 14 in order to identify and follow up individual target objects, and in order particularly to detect an immediately preceding vehicle in one's own lane, and to select it as target object. By commands to drive control unit 18 and brake system control unit 20, ACC control device 14, as the device for determining the acceleration and deceleration requirements, regulates the speed of vehicle 10. If no preceding vehicle is located, ACC control device 14 regulates the speed of motor vehicle 10 to a desired speed selected by the driver. If, however, a preceding vehicle, whose speed is less than that of one's own vehicle, has been recorded as target object, the speed of motor vehicle 10 is regulated in such a way that an appropriate distance from the preceding vehicle is maintained. Furthermore, a method for collision avoidance for motor vehicle 10 may also be implemented within the scope of a driver assistance system, in which, in the case of at least one obstacle approaching during travel, a driving maneuver of motor vehicle 10 is carried out or proposed autonomously or semiautonomously.

The driver assistance system or adaptive speed regulating device 11, in this context, uses an evaluation method, according to the present invention, for object detection using a radar sensor 12, which sends out separate radar beam lobes Beam1 to Beam4 that cover an angular range to be scanned (in FIGS. 2, 3 and 4, for instance, −100 to +100) synchronously in time and receives their respective target responses as measured values. As may be seen in FIG. 3, two target responses of two separate radar beam lobes Beam2, Beam3 of radar sensor 12 are arithmetically superposed in such a way that a synthetic radar beam lobe BeamS1 is created, having a predetermined zero value N1 in the scanned angular range. The arithmetic superposition is carried out using a complex weighting of one of the two target responses of the radar beam lobes Beam2, Beam3 in such a way that for one target object that has been detected at the predetermined zero value N1, the two target responses add up to zero. Now, if zero value N1 is placed at the angular value of a detected target object, at 0° in the present exemplary embodiment, one thereby obtains further information on the target object. In additional exemplary embodiments that are not shown, the at least one predetermined zero value may also be placed at the angular value of the middle of the lane lying ahead of motor vehicle 10. Furthermore, it may be provided that a scanning displacement of the at least one predetermined zero value is carried out arithmetically in the scanned angular range.

In the present exemplary embodiment, as mentioned above, the target object is detected by radar sensor 12 at an angular value of 0°. However, this target object actually comes about from a superposition of two target objects, which are located, for instance, in the side lanes at a distance of 120 m, each offset laterally by 3 m, or to the right and left of motor vehicle 10 at −1.4° and +1.4°. Now, if zero value N1 of synthetic radar beam lobe BeamS1 is placed at angular value 0° of the detected target object, it may be checked whether only one target object is present at 0° or a plurality of target objects is present at displaced angles. If only one target object were present at 0°, its level would have to decrease greatly during detection. If this is not the case, the duplicate test described below may be applied. On the assumption that the two actually present target objects are located at −1.4° and +1.4°, analogously to synthetic radar beam lobe BeamS1, shown in FIG. 3, having the zero value at 0°, a first synthetic radar beam lobe having a zero value at −1.4° and a second synthetic radar beam lobe having a zero value at +1.4°, may be calculated, especially one after the other. A minimum of the absolute values from the first and the second synthetic radar beam lobe then yields the synthetic radar beam lobe BeamS2 shown in FIG. 4, having zero values N2a, N2b at −1.4° und +1.4°. The two separated target objects are then greatly damped, and it is able to be detected whether there is still another target object between them, which will become detectable in that the level with respect to the measured values from the target responses of radar beam lobes Beam2, Beam3 decreases only a little. Consequently, the achievable separation capability is very great, for example, separation of the zero values of only 1.6° is conceivable. Thus, on account of the evaluation method according to the present invention, additional information with respect to angular resolution may advantageously be found out.

The evaluation method and the method for collision avoidance according to the present invention, for motor vehicle 10, may be implemented as a computer program on control device 14 of driver assistance system 11 of motor vehicle 10 or of radar sensor 12, other design approaches also coming into consideration, of course. For this purpose, the computer program is stored in a memory element of control device 14. The method is implemented by processing on a microprocessor of control device 14. The computer program may be stored on a computer-readable data carrier (diskette, CD, DVD, hard disk, USB memory stick, memory card or the like) or an internet server as a computer program product, and may be transmitted from there to the memory element of control device 14.

What is claimed is:

1. A method for a driver assistance system of a motor vehicle having a radar sensor for object detection, the method comprising:
   synchronously emitting by the radar sensor at least two separate radar beam lobes which cover an angular scan range;
   receiving by the radar sensor at least two respective target responses of the at least two separate radar beam lobes as measured values; and
   arithmetically superposing the at least two target responses of the at least two separate radar beam lobes to generate at least one synthetic radar beam lobe having at least one predetermined zero value in the angular scan range;
   wherein the at least one predetermined zero value is placed at an angular value of a detected target object.

2. The evaluation method as recited in claim 1, wherein the arithmetic superposition is carried out using a complex weighting of at least one of the at least two target responses in such a way that, for a target object detected at the at least one predetermined zero value, the at least two target responses add up to zero.

3. The evaluation method as recited in claim 1, wherein the at least one predetermined zero value is placed at the angular value of the middle of a road lane lying ahead of the motor vehicle.

4. The evaluation method as recited in claim 1, wherein a scanning displacement is carried out of the at least one predetermined zero value in the angular scan range.

5. The evaluation method as recited in claim 1, wherein the arithmetic superposition is carried out using a complex weighting of at least one of the at least two target responses in such a way that, for a target object detected at the at least one predetermined zero value, the at least two target responses add up to zero, and wherein the at least one predetermined zero value is placed at the angular value of the middle of a road lane lying ahead of the motor vehicle.

6. The evaluation method as recited in claim 1, wherein a scanning displacement is carried out of the at least one predetermined zero value in the angular scan range, and wherein the at least one predetermined zero value is placed at the angular value of the middle of a road lane lying ahead of the motor vehicle.

7. The evaluation method as recited in claim 1, wherein the arithmetic superposition is carried out using a complex weighting of at least one of the at least two target responses in such a way that, for a target object detected at the at least one predetermined zero value, the at least two target responses add up to zero, wherein the at least one predetermined zero value is placed at the angular value of the middle of a road lane lying ahead of the motor vehicle, and wherein a scanning displacement is carried out of the at least one predetermined zero value in the angular scan range.

8. A method for providing collision avoidance assistance for a motor vehicle, comprising:
   synchronously emitting by the radar sensor at least two separate radar beam lobes which cover an angular scan range;
   receiving by the radar sensor at least two respective target responses of the at least two separate radar beam lobes as measured values;
   arithmetically superposing the at least two target responses of the at least two separate radar beam lobes to generate at least one synthetic radar beam lobe having at least one predetermined zero value in the angular scan range, wherein the at least one predetermined zero value is placed at the angular value of a detected target object; and
   in response to the detected target object, providing an automated driving control of the motor vehicle,
   wherein the at least one predetermined zero value is placed at an angular value of a detected target object.

9. The evaluation method as recited in claim 8, wherein the arithmetic superposition is carried out using a complex weighting of at least one of the at least two target responses in such a way that, for a target object detected at the at least one predetermined zero value, the at least two target responses add up to zero.

10. The evaluation method as recited in claim 8, wherein the at least one predetermined zero value is placed at the angular value of the middle of a road lane lying ahead of the motor vehicle.

11. The evaluation method as recited in claim 8, wherein a scanning displacement is carried out of the at least one predetermined zero value in the angular scan range.

12. The evaluation method as recited in claim 8, wherein the arithmetic superposition is carried out using a complex weighting of at least one of the at least two target responses in such a way that, for a target object detected at the at least one predetermined zero value, the at least two target responses add up to zero, and wherein the at least one predetermined zero value is placed at the angular value of the middle of a road lane lying ahead of the motor vehicle.

13. The evaluation method as recited in claim 8, wherein a scanning displacement is carried out of the at least one predetermined zero value in the angular scan range, and wherein the at least one predetermined zero value is placed at the angular value of the middle of a road lane lying ahead of the motor vehicle.

14. The evaluation method as recited in claim 8, wherein the arithmetic superposition is carried out using a complex weighting of at least one of the at least two target responses in such a way that, for a target object detected at the at least one predetermined zero value, the at least two target responses add up to zero, wherein the at least one predetermined zero value is placed at the angular value of the middle of a road lane lying ahead of the motor vehicle, and wherein a scanning displacement is carried out of the at least one predetermined zero value in the angular scan range.

15. A computer-readable storage medium encoded with a computer program having program codes which, when executed on a computer, control an evaluation method for a driver assistance system of a motor vehicle having a radar sensor for object detection, the method comprising:

synchronously emitting by the radar sensor at least two separate radar beam lobes which cover an angular scan range;

receiving by the radar sensor at least two respective target responses of the at least two separate radar beam lobes as measured values; and arithmetically superposing the at least two target responses of the at least two separate radar beam lobes to generate at least one synthetic radar beam lobe having at least one predetermined zero value in the angular scan rang, wherein the at least one predetermined zero value is placed at an angular value of a detected target object.

16. A driver assistance system of a motor vehicle, comprising:

at least one radar sensor configured to a) synchronously emit at least two separate radar beam lobes which cover an angular scan range and b) receive at least two respective target responses of the at least two separate radar beam lobes as measured values; and a control device configured to arithmetically superpose the at least two target responses of the at least two separate radar beam lobes to generate at least one synthetic radar beam lobe having at least one predetermined zero value in the angular scan range, wherein the at least one predetermined zero value is placed at the angular value of a detected target object.

* * * * *